(No Model.)
M. L. MITCHELL.
WATER FILTER.
No. 544,262. Patented Aug. 6, 1895.
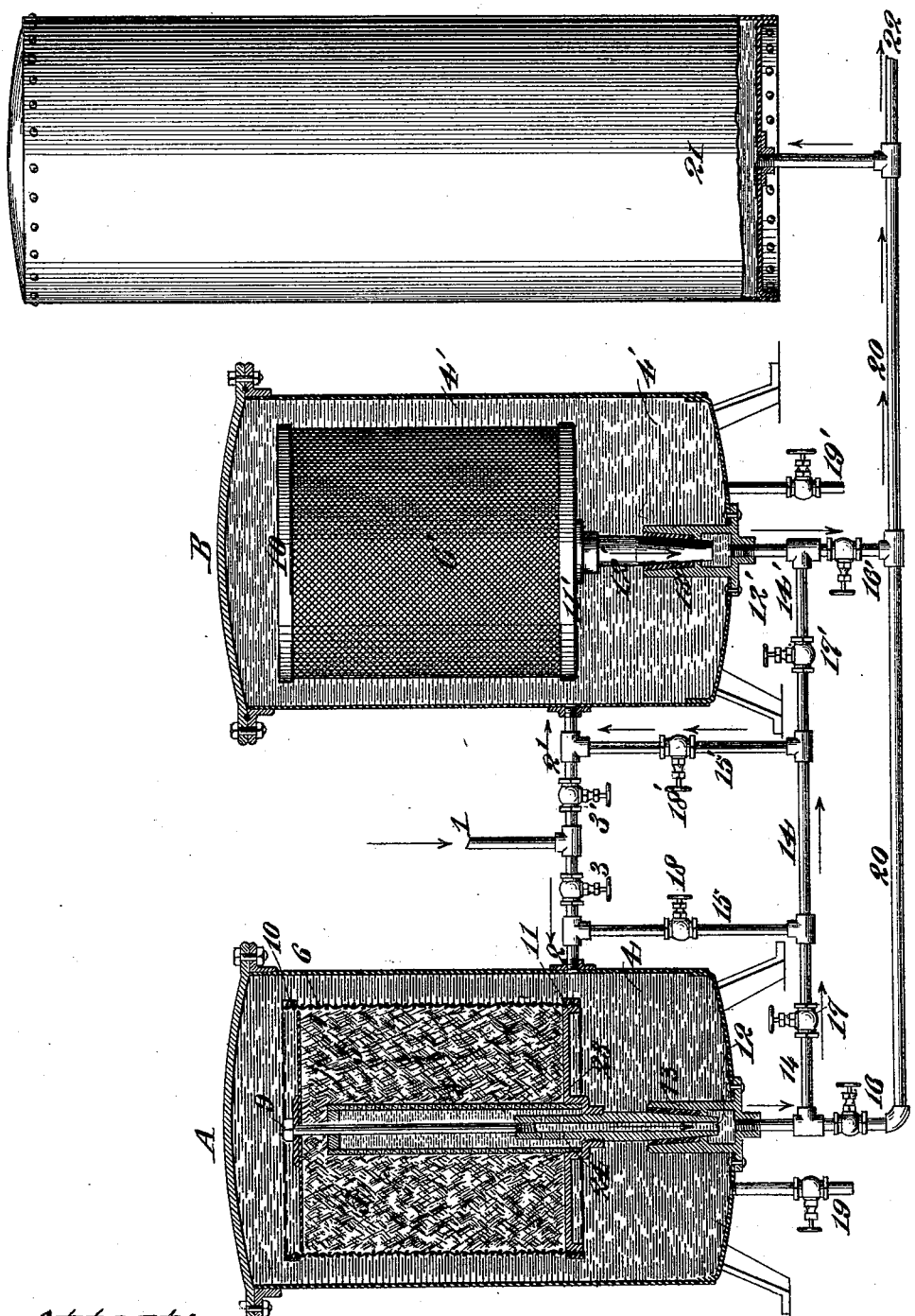
Attest:
Charles Pickles.
Stanley Stoner
Inventor:
Marcus L. Mitchell.
By Knight Bro
Attys

UNITED STATES PATENT OFFICE.

MARCUS L. MITCHELL, OF ST. LOUIS, MISSOURI, ASSIGNOR OF ONE-FOURTH TO JOSEPH R. LA TOUR, OF SAME PLACE.

WATER-FILTER.

SPECIFICATION forming part of Letters Patent No. 544,262, dated August 6, 1895.

Application filed April 5, 1895. Serial No. 544,662. (No model.)

*To all whom it may concern:*

Be it known that I, MARCUS L. MITCHELL, of the city of St. Louis, State of Missouri, have invented a new and useful Improvement in Water-Filters, of which the following is a description, reference being had to the accompanying drawing, forming a part of this specification.

My invention relates to an improvement in water purifying or filtering devices; and it consists of certain mechanical arrangements and constructions which possess features of novelty hereinafter specifically pointed out and claimed.

Referring to the drawing, there is shown a side elevation of the entire device, parts thereof being in section. The tank A and its interior filtering-basket are shown in vertical section, and the tank B is also shown in vertical section; but the filtering-basket contained therein is shown in elevation. The two tanks A and B are identical and are placed upon suitable supports.

1 is the pipe leading from the source of water-supply.

2 is a connection with the filtering-tank A.

3 is a stop-cock.

4 represents the water in the tank A, said water being unfiltered.

5 is a filtering substance, preferably mineral wool, which is packed in a basket 6 of gauze or other suitable material.

7 is a perforated rigid tube placed within the mineral wool 5.

8 is a bolt, which, by means of the nut 9, secures the top 10 and the bottom 11 of the basket containing the mineral wool firmly in the position shown.

12 is a pipe leading from the interior tube 7.

13 is a sleeve provided with packing about the exit of said pipe 12, which has a conical bottom to prevent sediment escaping.

14 is a pipe leading from the exit of tank A to the pipe 2 already described, and to the discharge 22.

16, 17, and 18 are stop-cocks.

19 is a drain-pipe.

21 is a storage-tank containing filtered water.

23 are perforations through the tube 7, and 24 are perforations through the tube 12.

The parts of the tank B which correspond with those of tank A are marked with the same numbers, bearing prime-marks.

The operation of my device is as follows: The unfiltered water is introduced through the pipe 1 while the stop-cocks 3' and 18 are closed, but stop-cock 3, of course, is open. The water then percolates through the interstices of the basket-frame 6, and thence through the filtering material, where the foreign matter and impurities are deposited. The clear water then passes through the perforations 23 of the tube 7, thence through the perforations 24 of pipe 12 and the pipe 20 at the exit of 12. If the filtering material does its work completely and the water is now clear, the stop-cock 16 is opened, and the water passes on out pipe 20 to tank 21; but if the water is not thoroughly clarified the stop-cocks 16 and 17' are closed and 17 and 18' are opened, which allows the water to pass through the pipes 14, 15', and 2' into the tank B, where the same process as already described is repeated in the said tank. Thence it passes out the pipe 20 to the storage-tank 21. When the filtering material in the tank A becomes clogged with the deposited impurities, the top thereof is removed and the mineral wool is taken out and either cleaned or replaced with fresh material. The basket-frame in which it is placed is removable. Thence the replacing or cleaning is easily accomplished. The stop-cock 3 may now be closed and 3' opened, which passes the water first through 2' into tank B. Here it is filtered, as already described, and if further filtration is unnecessary it passes immediately into the reservoir 21 through the pipe 20 for use; but if not yet clear the stop-cocks 16', 18', and 17 are closed and 17', 18, and 16 are opened. This passes the water through the pipes 15 and 2 into the tank A, where the process is repeated, the clear water passing out through the stop-cock 16 and pipe 20 to the storage-tank 21.

The filtering substance 5 is mineral wool, which ordinarily has an air-space of about ninety-five per cent. I compress the substance until I reduce this air-space to about fifteen or twenty per cent. in order to get the best results. When thus compressed the basket-netting 6 need not be used, as the mineral wool will keep its shape independently. The water then filters from the outside to the core, in which core is placed the perforated tube 7. The clarified water percolates through the perforations 23 to the exit. This method of filtering the water from the outside to the central core of the filtering substance is an essential feature of my invention.

What I claim as my invention, and desire to secure by Letters Patent, in an improved water-filter, is—

The combination with a filtering tank, of a filtering basket packed with mineral wool, a perforated pipe 7 in the center thereof, top 10 and bottom 11 to said filtering basket and bolt 9 to hold the same in position, an exit pipe from the said central perforated pipe 7, adapted to filter the water from the outside to the center of said basket, substantially as described.

MARCUS L. MITCHELL.

In presence of—
E. S. KNIGHT,
STANLEY STONER.